United States Patent
Cauwet

(10) Patent No.: US 7,562,889 B2
(45) Date of Patent: Jul. 21, 2009

(54) SUSPENDED FRONT STEERING SYSTEM FOR MULTIPLE ROTATION CYCLES

(76) Inventor: Jérôme Cauwet, 149, impasse des Grillons, Saint Cyr sur Mer (FR) F-83270

( * ) Notice: Subject to any disclaimer, the term of this patent is extended or adjusted under 35 U.S.C. 154(b) by 146 days.

(21) Appl. No.: 10/585,460

(22) PCT Filed: Jan. 5, 2005

(86) PCT No.: PCT/FR2005/000017

§ 371 (c)(1), (2), (4) Date: Jul. 7, 2006

(87) PCT Pub. No.: WO2005/073066

PCT Pub. Date: Aug. 11, 2005

(65) Prior Publication Data

US 2007/0272451 A1 Nov. 29, 2007

(30) Foreign Application Priority Data

Jan. 9, 2004 (FR) .................................. 04 00159

(51) Int. Cl.
B62K 25/08 (2006.01)
(52) U.S. Cl. ........................................ 280/276; 280/279
(58) Field of Classification Search ................ 280/275, 280/276, 277, 283, 279; 188/24.11
See application file for complete search history.

(56) References Cited

U.S. PATENT DOCUMENTS

| | | | |
|---|---|---|---|
| 447,750 A * | 3/1891 | Kenfield ..................... 280/276 |
| 723,075 A * | 3/1903 | Thoms ........................ 280/276 |
| 3,083,038 A * | 3/1963 | Moulton ...................... 280/276 |
| 3,208,767 A * | 9/1965 | Moulton ...................... 280/276 |
| 4,093,262 A | 6/1978 | Koyama et al. |
| 4,511,156 A | 4/1985 | Offenstadt |
| 4,616,523 A | 10/1986 | Jones et al. |
| 4,815,763 A * | 3/1989 | Hartmann ................... 280/276 |
| 4,881,750 A * | 11/1989 | Hartmann ................... 280/276 |
| 5,095,770 A | 3/1992 | Rader, III |
| 5,163,697 A * | 11/1992 | Kastan ....................... 280/276 |
| 5,193,832 A | 3/1993 | Wilson et al. |
| 5,238,259 A | 8/1993 | Wilson et al. |
| 5,241,881 A * | 9/1993 | Chen ......................... 74/551.2 |
| 5,269,549 A | 12/1993 | Wilson et al. |
| 5,308,099 A * | 5/1994 | Browning ................... 280/276 |
| 5,350,185 A * | 9/1994 | Robinson .................... 280/276 |
| 5,417,446 A | 5/1995 | Pileggi |
| 5,511,811 A | 4/1996 | Pileggi |
| RE35,401 E * | 12/1996 | Wilson et al. ............... 280/276 |
| 5,791,671 A | 8/1998 | Valdez et al. |
| 6,220,398 B1 * | 4/2001 | Wu .......................... 188/24.11 |
| 7,000,936 B2 * | 2/2006 | Schmider .................. 280/281.1 |

FOREIGN PATENT DOCUMENTS

| | | |
|---|---|---|
| DE | 3917839 | 12/1990 |
| EP | 0479138 | 4/1992 |

* cited by examiner

*Primary Examiner*—Tony H. Winner
(74) *Attorney, Agent, or Firm*—Greenblum & Bernstein, P.L.C.

(57) ABSTRACT

A telescopic steering system for a cycle includes a frame, a handlebar, a guiding piece, a steering column fixed to the frame, a plunger sliding and rotating axially in the steering column, a fork fixed to an end of the plunger, and a front wheel of the cycle positioned on the fork. Additionally, the guiding piece transmits rotational movement from the handlebar to the plunger.

9 Claims, 1 Drawing Sheet

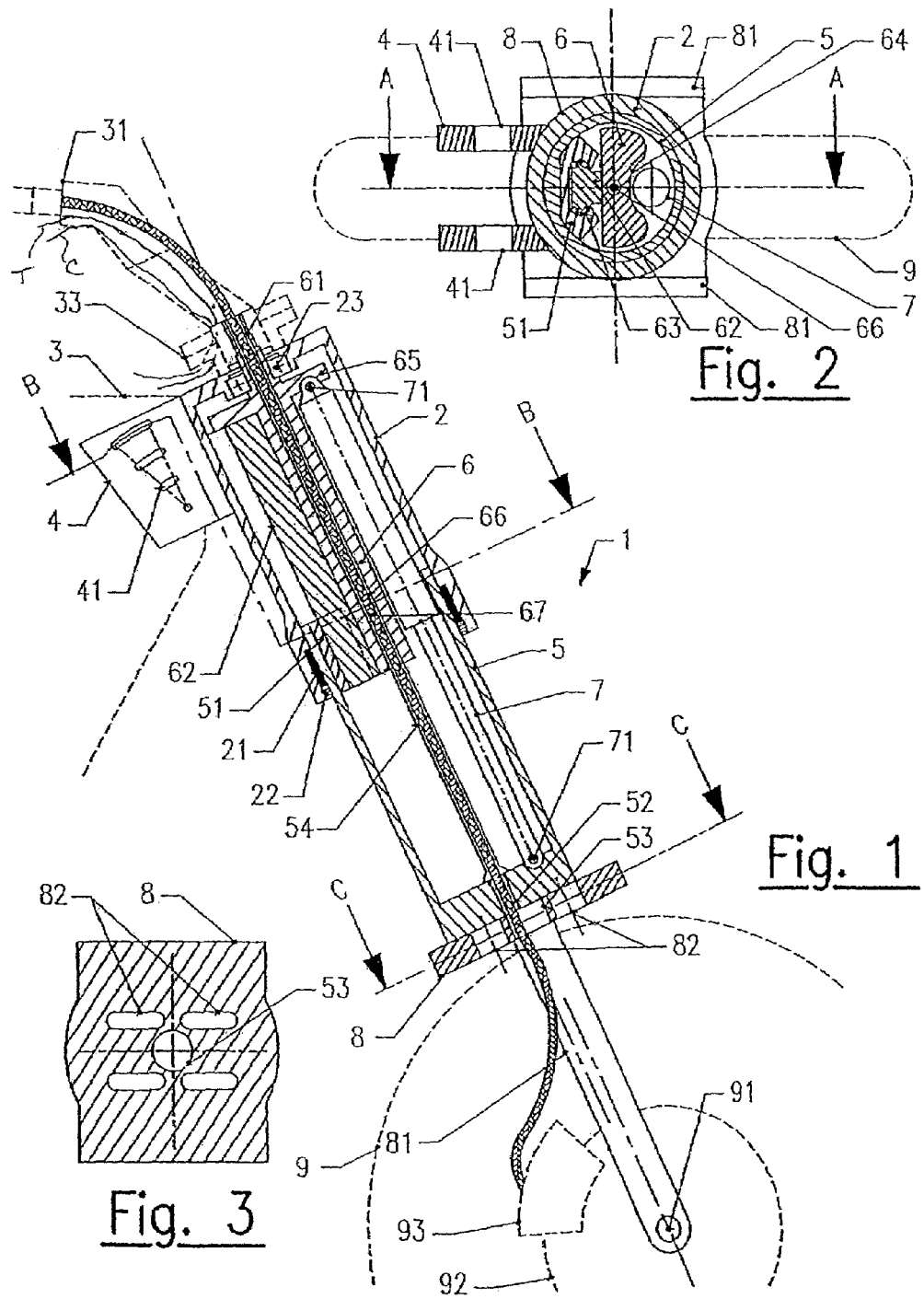

SUSPENDED FRONT STEERING SYSTEM FOR MULTIPLE ROTATION CYCLES

CROSS REFERENCE TO RELATED APPLICATIONS

The present application is a U.S. National Stage Application of International Application No. PCT/FR2005/000017 filed Jan. 5, 2005, which published as WO 2005/073066 A1 on Aug. 11, 2005, the disclosure of which is expressly incorporated by reference herein in its entirety. Further, the present application claims priority under 35 U.S.C. § 119 and § 365 of French Application No. 0400159 filed Jan. 9, 2004.

BACKGROUND OF THE INVENTION

1. Field of the Invention

The instant invention relates to a suspended front steering system for multiple rotation cycles.

The invention relates to the technical field of vehicle-steering elements, and, more specifically, elements of front steering systems for cycles that are used to perform acrobatic figures.

2. Background Description

Steering systems conventionally found in cycles such as bicycles or motorcycles are generally associated with shock absorbers to improve the rider's comfort, as well as the handling and control of the vehicle. These shock absorbers often comprise telescopic forks arranged in the area of the steering column and at the end of which the front wheel is connected.

The forks are made of two telescopic tubes arranged on both sides of the steering column, connected at their end to the front wheel axle. Conventionally provided with spring, gas, or hydraulic shock absorbers, these fork tubes are capable of dampening shocks and vibrations.

If the handlebar is pivoted about the steering axis, the fork tubes abut against the frame when a certain rotation angle is exceeded.

Furthermore, when the steering system pivots, the cables or the hydraulic brake hoses wind themselves up around the steering column, which interferes with the handlebar rotation.

A full handlebar rotation about the steering axis is therefore not possible with these conventional systems.

However, certain BMX-type bicycles have systems that enable a full handlebar rotation about the steering axis. The steering system is thus made of a tube, pivotable about the steering column and to the end of which the front wheel is fixed. A system known as the rotor located in the headset, forming a pivotable connection of the brake cables, provides braking while allowing a handlebar rotation about the steering column or of the bicycle around the handlebar, without entangling the brake cables. This system is commonly used for performing acrobatic figures. With this configuration however, the front wheel steering system is not provided with damping means.

The systems previously described do not therefore make it possible to simultaneously associate a full handlebar rotation about the steering axis with damping the front steering system of a cycle.

SUMMARY OF THE INVENTION

An aim of the present invention is to overcome this drawback by enabling the rider to perform acrobatic figures with a full 360° rotation of the handlebar about the steering axis or of the cycle about the handlebar, while guaranteeing damping and providing braking for the front wheel.

Another aim of the invention is to propose a new, compact telescopic steering system for cycles, which requires only minimum maintenance, is maneuverable, and ensures stability of the vehicle.

According to the invention, a telescopic-type steering system for cycles, includes a steering column fixed to the frame, a slidable plunger that is pivotable in the steering column, a fork fixed to the end of the plunger, on which the front wheel of the cycle is positioned, characterized in that a guiding element transmits the rotational movement from the handlebar to the plunger, and in that a shock absorber is housed between the guiding element and the inner wall of the plunger.

Plunger guiding and damping are thus separated, and all of the suspension and steering mechanisms are housed in the steering column to enable a 360° rotation of the handlebar.

Additionally, according to the invention, the brake hose goes inside the steering system through a central position and that this steering system is provided with a rotor system enabling the clutch and the throttle cables to pass through.

Furthermore, according to the invention, the steering column is provided with a system for adjusting the rake angle and that the system for fixing the fork on the plunger enables adjusting the cycle offset.

BRIEF DESCRIPTION OF THE DRAWINGS

Other characteristics and advantages of the present invention will be better understood from the non-limiting examples of the description that follows, with reference to the annexed drawings, in which:

FIG. 1 is a cross-sectional view along the line A-A of the device according to the invention installed on a motorcycle;

FIG. 2 is a cross-sectional view along the line B-B of the device according to the invention;

FIG. 3 is a cross-sectional view along the line C-C of the upper portion of the fork showing the system for fixing the fork on the plunger for adjusting the offset.

DETAILED DESCRIPTION OF THE INVENTION

Referring to the annexed drawings, the steering system 1 is made of a steering column 2 having a cylindrical shape and a diameter on the order of 160 millimeters.

The steering column can be made of aluminum carved from the block or of any other material having similar properties.

The lower portion of the steering column is open in order to house the plunger 5 while its upper portion is closed but enables housing a guiding element 6.

The steering column is therefore used, with the plunger 5, to form a cylindrical fork slider in which most of the constituent elements of the steering system of the invention are housed.

The steering column 2 is fixed at the front of the motorcycle frame 3 by a system for adjusting the rake angle 4. The steering column axis defines the steering axis.

The rake angle is the angle between the vertical and the steering axis. This system for adjusting the rake angle is made of two substantially vertical parallel plates which are positioned in the frame front portion, each plate being provided with a series of oblong holes 41 of increasing width allowing fixing screws to be housed so as to maintain the steering system 1 in position, as shown in FIGS. 1 and 2.

By varying the position of the oblong holes with respect to the screws, the inclination of the steering column can be adjusted with respect to the vertical, and the rake angle can therefore be adjusted.

The rider thus has a device for easily adjusting the geometry of his motorcycle according to his preferences in order to play with the maneuverability and the responsiveness of the steering as well as with the stability of his machine.

A plunger 5 is mounted inside the steering column 2. This plunger has a tubular shape, preferably made of aluminum carved from the block, or any other material having similar properties, coaxial with respect to the steering column and slidable and axially pivotable in the steering column.

The inner diameter of the steering column and the outer diameter of the plunger are substantially equal, so that they form a telescopic tube (FIG. 1).

In a preferred embodiment, the outer surface of the plunger is rectified and subjected to a surface treatment to limit frictions and ensure a greater wear and projections resistance.

The upper portion of the plunger is open and its lower portion is closed. The steering column and the plunger 5 thus form a telescopic cylindrical fork slider in which most of the constitutive elements of the steering system are housed.

A composite bearing 21 and a wiper 22 are housed in the lower portion of the steering column 2.

The function of the composite bearing 21 is to reduce the frictions between the plunger 5 and the steering column 2 and to ensure the rotational guiding of the plunger. This way, the plunger can easily pivot and slide in the steering column.

The wiper 22, positioned under the composite bearing 21, enables scraping the debris, which are on the outer wall of the plunger 5. The outer cleanliness of the plunger is thus ensured and the risk of having debris deteriorate the composite bearing 21 is averted.

The plunger 5 is set in rotation due to a guiding piece 6, which is elongated in the steering axis direction and preferably made of aluminum carved from the block or of any other material having similar properties. Positioned in the upper portion of the steering column 2, it is pivotably mounted with respect to the steering axis by bearings 23 used for reducing frictions and for guiding in rotation.

The handlebar 31 of the motorcycle 3 fixes itself on the portion 61 of the guiding piece 6, which protrudes from the steering column 2, as shown in FIG. 1. The rider will therefore set the guiding piece 6 in rotation by turning the handlebar.

The guiding piece 6 receives, on its outer wall, a linear guiding rail 62, that is parallel to the steering axis. A slide 51 having a complementary shape, located on the inner wall of the plunger 5, is housed in this guiding rail (FIG. 2).

This guiding rail is rectified with a surface treatment and comprises tracks 63 to reduce frictions with the slide 51. The slide 51 can also be rectified and treated.

The function of the guiding rail 62 is to guide the plunger 5 in translation and to transmit the turning torque to the plunger. This way, the plunger turns at the same time as the motorcycle handlebar and can easily slide in the steering column.

The guiding piece 6 allows separating the plunger's rotational and translational guiding mechanism from the damping mechanism.

The positioning and configuration of the guiding piece 6 form a space between the inner wall of the plunger 5 and the outer wall of the guiding piece in order to house the shock absorber 7. In the embodiment shown in FIGS. 1 and 2, the guiding piece 6 has, on its outer wall, opposite the guiding rail 62, a concavity 64 which, with the inner wall of the plunger 5, forms a housing for the shock absorber 7.

The shock absorber 7 can be either of the conventional type, such as spring, gas, or hydraulic shock absorber or designed specifically for a particular application. Since the shock absorber is independent from the guiding mechanism and the mechanism for setting the plunger in rotation, its design does not depend on the geometry of these elements. The rider can therefore use commercially available shock absorbers or shock absorbers that are specific to the use of the motorcycle (racing, all-terrain, acrobatic figures . . . ) without having to modify the design of the other constitutive elements of the invention.

The guiding piece 6 has, in its upper portion, a shoulder 65 to which the end of the shock absorber 7 is fixed, the other end being fixed to the bottom of the plunger 5 as shown in FIG. 1. The shock absorber is fixed in the area of the plunger and of the guiding piece by a ball-and-socket joint 71 making it possible to compensate for the deformations, the clearances, or the non-parallelism of the shock absorber 7 axis and the translation axis of the plunger 5.

A fork 8, which allows transmitting the rotational movement of the plunger 5 to the front wheel 9 of the motorcycle, is fixed at the lower end of the plunger 5. It is preferably made of mechanically welded aluminum or of any other material having similar properties.

The fork 8 has two arms 81 connected to the front wheel 9 of the motorcycle (FIG. 1). The lower end of these two arms is machined to receive the axle 91 of the front wheel and the fastening of the front brake cylinder 92.

As shown in FIGS. 1 and 3, the upper portion of the fork 8 is fixed to the plunger 5 with a device for adjusting the offset formed by oblong holes 82 elongated toward the front of the cycle, housing the fastening screws that maintain the fork 8 in position on the plunger 5.

The distance between the fork axis and the steering axis can be adjusted by varying the radial position of the fork 5 in order to lessen the effort required from the rider to turn the handlebar and in order to increase the stability of the motorcycle.

The rider can therefore easily adjust the geometry of his/her motorcycle according to his/her preferences to play with the maneuverability and the stability of the motorcycle.

A housing 66, in which the front brake hose 67 slides, is machined in the central portion of the guiding piece 6. This housing allows positioning the brake hose in the area of the steering axis.

A tube 54 maintaining the front brake hydraulic hose, so that it is guided along the entire course of the plunger (FIG. 1), is positioned in the central portion of the plunger 5. This tube 54 is arranged so as to be slidable inside the housing 66 of the guiding piece 6 to prevent the brake hose from getting wedged.

Similarly, housings 52 and 53 are provided at the lower end of the plunger 5 and in the upper portion of the fork 8, respectively, to allow for the passage of the brake hose 67 up to the front braking device 93. This way, the front brake hose does not get tangled up around the steering column during the full rotation of the handlebar about the steering axis.

The controls for the throttle and the braking of the front wheel and for the clutch are generally positioned in the area of motorcycle handlebars.

To prevent the clutch cable C and throttle cable T from getting entangled around the handlebar during the rotation of the steering system about the steering axis, a pivoting connection of the cable or rotor system 33 has been provided in the area of the steering column and handlebar. For the sake of clarity, this rotor system, frequently used on BMX-type bikes, is not described in detail in the annexed drawings.

This system comprises two concentric couples, the upper couple fixed to the handlebar being pivotable with respect to the lower couple fixed in the area of the steering column. These two couples also have the particularity of being slidably mounted so that when the upper couple is pulled upward, it drives the lower couple.

Having the housings 52 and 66 and the rotor system 33 therefore prevents the clutch cable C and throttle cable T from getting tangled up around the steering column during the rotation of the steering system.

During the ride, the impacts to the wheel 9 due to bumps and the unevenness of the road are transmitted by the fork 8 to the plunger 5, the latter moving telescopically in the steering column 2 due to the guiding piece 6 and being damped due to the shock absorber 7.

The presence and the positioning of the various constitutive elements give the invention maximum useful effects, which had not, to date, been obtained by similar devices.

The invention claimed is:

1. A telescopic steering system for a cycle, comprising:
    a frame;
    a handlebar;
    a guiding piece;
    a steering column fixed to the frame;
    a plunger sliding and rotating axially in said steering column;
    a fork fixed to an end of said plunger;
    a front wheel of the cycle positioned on the fork;
    a linear guiding rail affixed to the guiding piece; and
    a slide, having a complementary shape to the linear guiding rail, located on an inner wall of the plunger,
    wherein the guiding piece transmits rotational movement from the handlebar to the plunger.

2. The steering system for cycles according to claim 1, further comprising a shock absorber housed between said guiding piece and the inner wall of said plunger.

3. The steering system for cycles according to claim 1, wherein the guiding piece is pivotally mounted in an upper portion of the steering column.

4. The steering system for cycles according to claim 1, wherein an inner diameter of the steering column and an outer diameter of the plunger are substantially equal.

5. The steering system for cycles according to claim 1, further comprising a front brake hose, wherein the front brake hose passes within the steering system through a central position.

6. The steering system for cycles according to claim 1, further comprising:
    clutch cables; and
    throttle cables, wherein
    the clutch cables and the throttle cables are provided with a rotor system.

7. The steering system for cycles according to claim 1, further comprising two plates having a series of oblong holes, wherein the steering column is positioned on a front portion of the frame by the two plates.

8. A telescopic steering system for a cycle, comprising:
    a frame;
    a handlebar;
    a guiding piece;
    a steering column fixed to the frame;
    a plunger sliding and rotating axially in said steering column;
    a fork fixed to an end of said plunger;
    a front wheel of the cycle positioned on the fork; and
    a concavity on an outer wall of the guiding piece, wherein the concavity and the inner wall of the plunger form a housing for the shock absorber, and
    wherein the guiding piece transmits rotational movement from the handlebar to the plunger.

9. A telescopic steering system for a cycle, comprising:
    a frame;
    a handlebar;
    a guiding piece;
    a steering column fixed to the frame;
    a plunger sliding and rotating axially in said steering column;
    a fork fixed to an end of said plunger; and
    a front wheel of the cycle positioned on the fork,
    wherein the guiding piece transmits rotational movement from the handlebar to the plunger, and
    wherein the fork further comprises an offset adjustment device having oblong holes the fork is fixed to the plunger by the offset adjustment device.

* * * * *